United States Patent [19]

Martinez

[11] Patent Number: 4,927,255
[45] Date of Patent: May 22, 1990

[54] AUXILIARY REAR VIEW MIRROR ASSEMBLY

[76] Inventor: Santiago Martinez, 87 Davis Rd., Storrs, Conn. 06268

[21] Appl. No.: 317,602

[22] Filed: Mar. 1, 1989

[51] Int. Cl.⁵ ............................................. G02B 27/02
[52] U.S. Cl. .................................... 350/616; 350/611; 350/632
[58] Field of Search ............... 350/605, 606, 616, 617, 350/625–627, 632, 636, 639, 611; 248/467, 481, 488

[56] References Cited

U.S. PATENT DOCUMENTS

| | | |
|---|---|---|
| 2,214,639 | 3/1940 | Lenta . |
| 2,906,292 | 9/1959 | Mayo ................................ 350/636 |
| 2,979,989 | 11/1960 | Calder, Jr. . |
| 2,988,957 | 6/1961 | Kotora, Jr. ......................... 350/605 |
| 2,999,427 | 9/1961 | Newcomb ........................... 350/631 |
| 3,145,257 | 5/1964 | Suga . |
| 3,901,587 | 8/1975 | Haile .................................. 350/632 |
| 4,019,812 | 7/1977 | Carnine . |
| 4,171,648 | 10/1979 | Manzgni ............................. 350/606 |
| 4,381,142 | 4/1983 | McColgan .......................... 350/623 |
| 4,487,479 | 11/1984 | Tolomeo, Sr. . |
| 4,526,446 | 7/1985 | Adams ............................... 350/626 |
| 4,598,982 | 2/1986 | Levine . |
| 4,626,086 | 12/1986 | Ohyama .............................. 350/632 |
| 4,718,756 | 3/1988 | Lancaster . |
| 4,728,180 | 3/1988 | Janowicz ............................ 350/626 |
| 4,793,701 | 12/1988 | Brown ................................ 350/636 |

Primary Examiner—Bruce Y. Arnold
Assistant Examiner—T. Nguyen
Attorney, Agent, or Firm—Wall and Roehrig

[57] ABSTRACT

An auxiliary rear view mirror device has left and right auxiliary mirrors and support plates which mount onto the back of the frame of an existing main rear view mirror. An adjustable support brace can connect the two support plates. A support arm assembly connects the support plates to the associated auxiliary mirrors, and provides for independent adjustment of mirror position in three dimensions, in addition to permitting angulation adjustment for each mirror. This can include a rack and toothwheel for lateral adjustment, and a threaded post for elevational adjustment. A vertical hinge can be employed for front-to-back adjustment. The assembly can be provided as original equipment, including a main mirror and associated auxiliary mirrors, or as assemblies to attach onto an existing rear view mirror.

34 Claims, 9 Drawing Sheets

AUXILIARY REAR VIEW MIRROR ASSEMBLY

BACKGROUND OF THE INVENTION

The present invention relates to interior rear view mirrors for motor vehicles, and is more particularly directed to an auxiliary mirror assembly which permits a vehicle operator to see into blind zones or voids in the mirror viewing area. This invention is more specifically concerned with an auxiliary mirror assembly that permits views to the sides into adjacent traffic lanes.

Vehicles are typically provided with an inside rear view mirror that provides a view to the rear through the vehicle rear window, an outside mirror mounted on the driver's side and another outside mirror mounted on the passenger's side of the vehicle. The inside mirror and the driver-side outside mirror are required to be of unit magnification (i.e., flat). Thus, their field of view is somewhat limited and there exist blind zones or blind spots in their coverage. Consequently, another vehicle travelling in an adjacent lane and a few feet behind the first vehicle would not be seen. The passenger-side outside mirror is often convex to provide wider coverage. However, in this type of mirror objects appear to be further from the vehicle than they in fact are, which can lead to errors in operator judgment. Also, even a convex mirror will not always reveal another vehicle in the blind zone.

Because of these blind zones or blind spots, collisions can occur when changing lanes, because a trailing vehicle in the next lane would not be detected in any of the mirrors. Consequently, for careful drivers, the practice of turning the head is required, to look out the side windows directly into the blind zone before maneuvering into the next lane. However, turning the head is unsafe as it requires looking away from the forward direction of travel. Also, for many drivers, turning the head can be painful or simply impossible.

Various extension mirrors have been proposed for seeing into blind zones, and a typical extension mirror is described in U.S. Pat. No. 4,598,982. There, an extension mirror is hinged to one side of a main inside rear view mirror, and can also be extended out laterally. However, because it is not possible to adjust the mirror angle, or to move the extension mirror up and down, or back and forth, it is difficult for the operator to position the main rear view mirror and any auxiliary mirrors to accommodate the operator's sitting position or to see clearly into blind zones to the left and right of the vehicle.

OBJECTS AND SUMMARY OF THE INVENTION

Accordingly, it is an object of this invention to provide a rear view mirror assembly through which a vehicle operator can view into blind zones, and which avoids the drawbacks of the prior art.

It is another object of this invention to provide an auxiliary rear view mirror assembly which can be attached onto an existing inside rear view mirror and which will not obstruct its operation.

It is yet another object of this invention to provide a rear view mirror system in which one or more auxiliary mirrors can be adjusted for position in three separate planes, relative to a main rear view mirror, and can be further adjusted for angulation.

It is still another object of this invention to provide an improved rear view mirror assembly in which lateral, vertical, and depth adjustments of the one or more auxiliary mirrors by simple manipulation of knobs or the like.

According to one aspect of this invention, an auxiliary rear view mirror assembly attaches onto an existing automotive interior main rear view mirror frame. The auxiliary mirror assembly has at least one auxiliary mirror, and preferably a pair of mirrors, disposed one to the right and the other to the left of the main mirror. There is at least one support plate that attaches onto a rear surface of the main mirror frame, and is clamped or strapped onto the same. An auxiliary arm supports the associated auxiliary mirror from the support plate beyond one end of the main mirror frame. There are means provided on the arm and/or on the support plate for independently adjusting the position of the auxiliary mirror in three separate planes or, relative to the main mirror, after the assembly is attached in place onto the main rear view mirror. This permits the operator to independently raise or lower each auxiliary mirror, move it fore and aft, i.e., for depth, and move it laterally right and left, i.e., closer to or farther from the end of the main rear view mirror. Additionally, each auxiliary mirror can be angularly positioned to provide the driver full visibility into what heretofore have been blind spots.

The means for adjusting the positions of the auxiliary mirrors can take the form of one or more articulations in the auxiliary mirror support arm. Also, lateral adjustment can be effected by a rack and wheel mechanism on the support plate, and vertical adjustment can be effected by a screw elevator to move a moveable part of the support plate up or down relative to a fixed part of the support plate. A pivot connector is also provided that allows the mirror to be angularly adjusted about a central pivot point.

According to another aspect of the invention, a rear view mirror assembly is provided for installation as original equipment or to replace an existing mirror, and has a main rear view mirror, at least one, but preferably a pair of auxiliary mirrors, and associated support arms. The main mirror has a laterally elongated housing with the mirror glass mounted in its front side. Auxiliary mirror supports and adjusting mechanism permit the auxiliary mirrors to be positioned in three dimensions relative to the mirror, in addition to adjusting their mirror angle. In one version, there can be T-shaped channel cutouts in the back of the main mirror frame, and there are support plates which can travel vertically in these cutouts to move the associated auxiliary mirrors up or down. A threaded elevator rod and knob are provided for this. Also, a rack and toothed wheel control lateral movement of the auxiliary mirror.

A system for a blind-to-the rear vehicle, e.g. a truck or van, can have a dummy mirror installed as supporting means with auxiliary mirrors supported on it. The supporting means for this can be female sleeves or casing halves that fit onto a male support. The male support can also serve as a mount for a clock or instrument indicator.

The above and other objects, features and advantages of this invention will be more fully understood from the ensuing description of a number of selected preferred embodiments, which should be read in connection with the accompanying drawing.

DETAILED DESCRIPTION OF THE PREFERRED EMBODIMENTS

Figure 1:
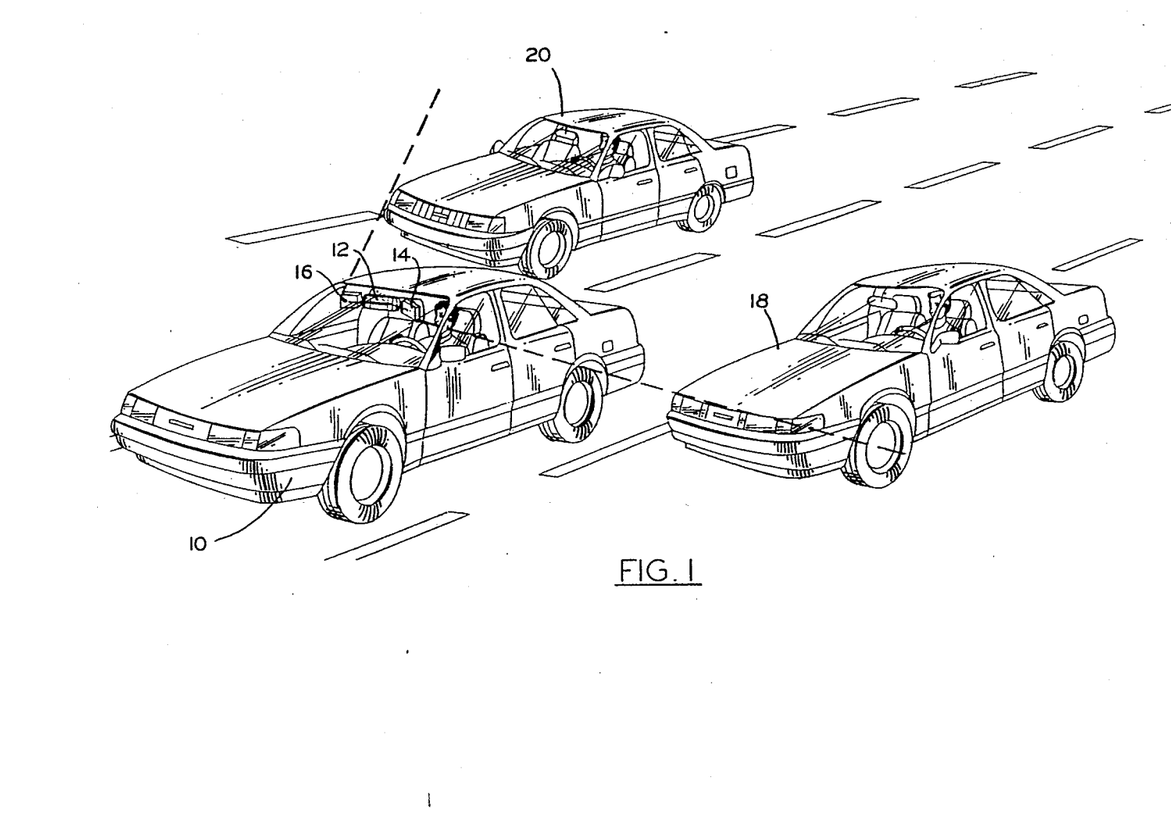
FIG. 1 is an environmental perspective view of a vehicle equipped with a rear view mirror of this invention for illustrating the advantageous features thereof.
Figure 2:
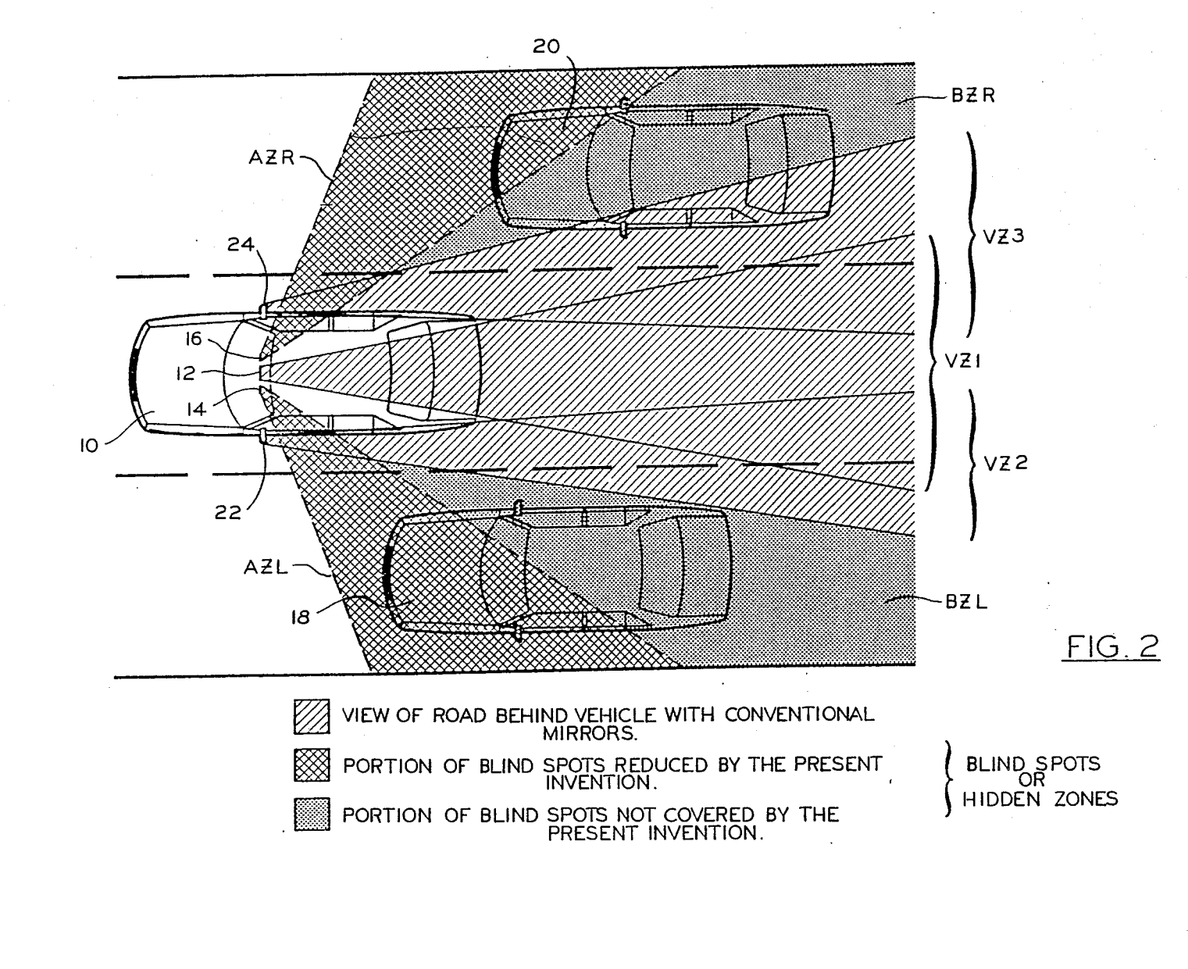
FIG. 2 is a top plan view of a vehicle illustrating the problem of blind or hidden zones and the reduction thereof when employing auxiliary rear view mirrors according to an embodiment of this invention.
Figure 3:
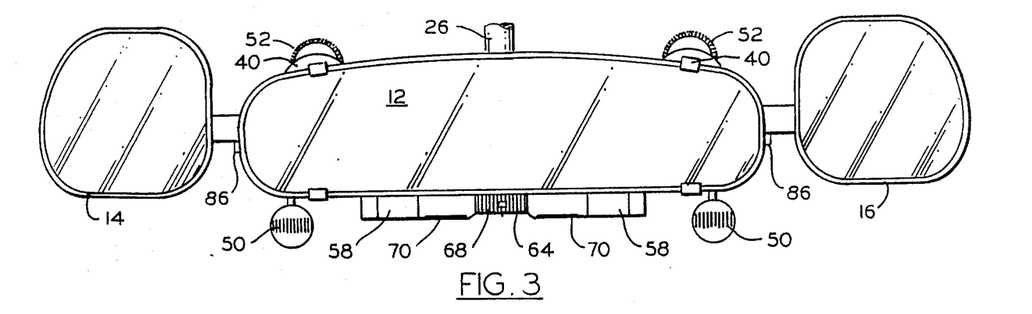
FIGS. 3, 4 and 5 are a front elevation, top plan, and rear perspective view of an auxiliary rear view mirror assembly according to a first embodiment of this invention.
Figure 4:
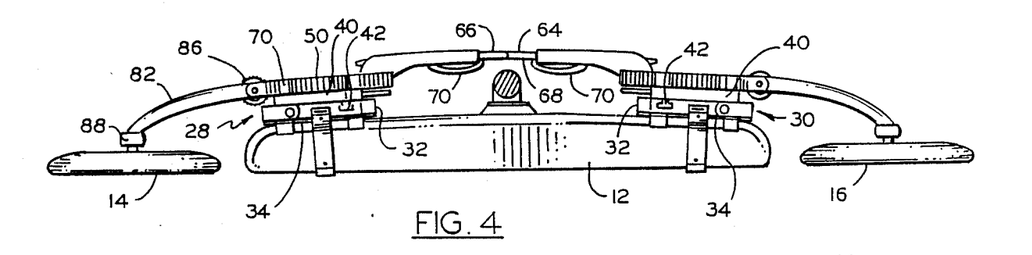

With reference to the Drawing, and initially to FIGS. 1 and 2, a passenger automobile 10 or other motor vehicle has an inside rear view mirror 12 and a pair of auxiliary rear view mirrors 14 and 16, mounted respectively to the left and right of the main mirror 12. The vehicle is shown in moderate traffic accompanied by other vehicles 18 and 20, slightly behind and occupying adjacent traffic lanes to that of the automobile 10, one on the left and the other on the right.

The auxiliary mirrors 14 and 16 provide views through the driver side window and through the passenger side window, so that the vehicles 18 and 20 are visible. Vehicles 18 and 20 would not otherwise be in view in the standard inside and outside rear view mirrors.

As shown in FIG. 2, the inside rear view mirror 12 provides a view through the automobile's rear window into a viewing zone VZ1, while left and right outside mirrors 22 and 24 provide adjacent viewing zones VZ2 and VZ3, respectively. As can be appreciated from the overhead view in FIG. 2, vehicles 18 and 20, which are in adjacent lanes, but slightly trailing the first vehicle 10, would be outside of these viewing zones VZ1, VZ2, and VZ3. There are blind zones BZL and BZR to the left and right of the vehicle 10. The right-side vehicle 20, which is shown as partly in the viewing zone VZ3 of the right-side mirror 24, will become less visible as it pulls forward to where it would be more likely to be struck if the vehicle 10 changes lanes.

However, the left and right auxiliary mirrors 14 and 16 provide views out through the side windows of the automobile 10, creating left and right auxiliary viewing zones AZL and AZR, respectively. Both of the adjacent vehicles 18 and 20 are clearly visible in one or the other of the auxiliary mirrors 14 or 16. The mirrors 14,16 are of unit magnification. Any remaining blind zones between the coverage of the zones AZL and VZ2, or between the zones AZR and VZ3 are greatly reduced, and would not conceal a vehicle in the adjacent lane on either side.

As shown in FIGS. 3–7, according to a first of several preferred embodiments, the auxiliary mirrors 14 and 16 can be piggy-backed on the corresponding side of the main rear view mirror 12, and then each of the mirrors 14 and 16 can be independently moved up and down, front to back and laterally left to right, with respect to the main mirror. This permits adjustment to an optimum position for each individual operator to see into the respective viewing zones AZL and AZR. That is, auxiliary mirrors 14 and 16 have respective mounting assemblies to permit movement in three dimensions, plus angular movement, including lateral, i.e., left-to-right movement, vertical, i.e., up-and-down movement, and depth, i.e., front-to-back to adjust distance from the operator, as well as angular adjustment of each of the mirrors 14 and 16. The main rear view mirror 12 is fastened by a conventional mounting arm 26, either to the windshield or to a point on the automobile frame.

The left and right auxiliary mirrors 14 and 16 have respective left and right mounting plate assemblies 28 and 30. Each mounting plate assembly has a support plate 32 having a cover 34 on which there are installed a plurality of rubber or plastic pads 35, and upper and lower straps 36 with hook ends. The straps 36 are resiliently mounted to the support plate 32. There are two vertical T-channel slots 38 at the back side of each support plate 32.

Figures 5, 6, 7:
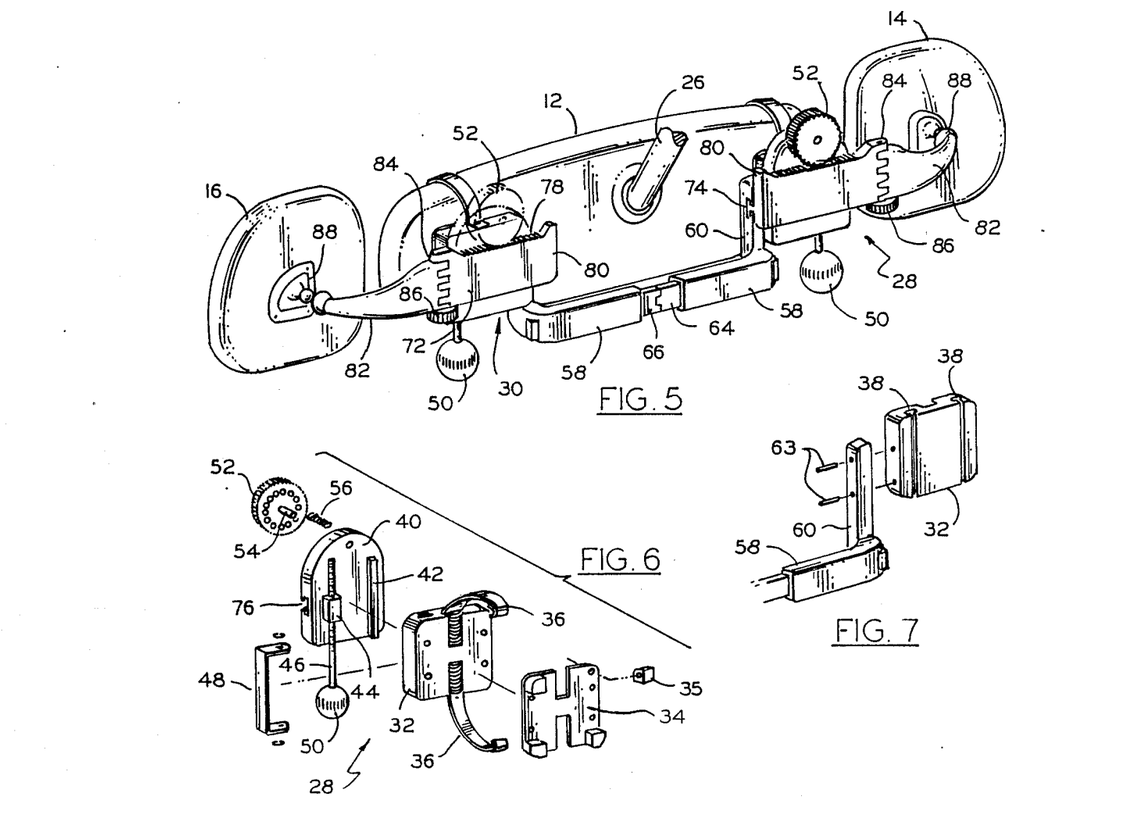
FIG. 6 is an exploded view of a support plate assembly of the first embodiment.
FIG. 7 is an extended view showing a portion of a support connector and the support plate of the first embodiment.

A moveable plate 40 has a vertical elongated T-rib 42, and a vertical short T-rib 44 in the form of a threaded nut having a vertical opening therethrough. A threaded post 46 extends vertically through this opening and is maintained in place on the support plate 32 by means of a C-shaped retainer clip 48. A ball knob 50 is mounted at the lower end of the threaded post 46. Manual rotation of the knob 50 causes the short T-rib 44 and the associated movable plate 40 to be raised or lowered with respect to the support plate 32.

A toothed wheel 52 is situated on a horizontal pivot 54 and is mounted at an upper side of each of the movable plates 40. A spring detent 56, as shown in FIG. 6, yieldably holds the wheel 52 at each of a plurality of angular settings.

The two mounting plate assemblies 28 and 30 are supported on one another by means of a pair of female tubular connector members 58. Each of these members is generally L-shaped with an upward leg 60 being connected by means of pins 63 to the associated support plate 32. A male toothed bar 64, which has a vertical hinge 66 at its center, is inserted into each horizontal leg of the two female connectors 58. A toothed front surface 68 of this male toothed bar 64 is engaged by spring clips 70 situated on the front side of the connector members 58.

For each mirror 14 and 16, there is a rack member 72 having a T-cross section rib 74 that extends laterally to slide in a horizontal T-channel slot 76 on the rear side of the associated movable plate 40. An upper rack of teeth 78 on each rack member 72 engages the teeth of the wheel 52. As each of the respective toothed wheels 52 is rotated by an operator, the rack member 72 moves laterally a desired amount. A raised stop 80 limits the outward movement of the rack member 72.

A support arm 82 is connected between each mirror 14, 16 and its respective rack member 72. In this embodiment, the support arm 82 is connected by a vertical hinge 84 to an outer end of the respective rack member 72. This permits the arm 82 to be swung generally toward or away from the operator to adjust the depth position of the respective mirror 14 or 16. A knob 86 tightens a pin through the hinge 84 after adjustment has been made. Other articulation means could serve in place of the hinge 84.

Alternatively, the toothed wheel 52 could be disposed on the support arm and the rack of teeth fixed on the movable plate 40.

A universal ball-type mount 88 at the outer end of the arm 82 connects to the respective mirror 14 or 16, to permit angular adjustment, both horizontally and vertically, independent of the vertical, lateral, and depth adjustment.

Figures 8, 9:
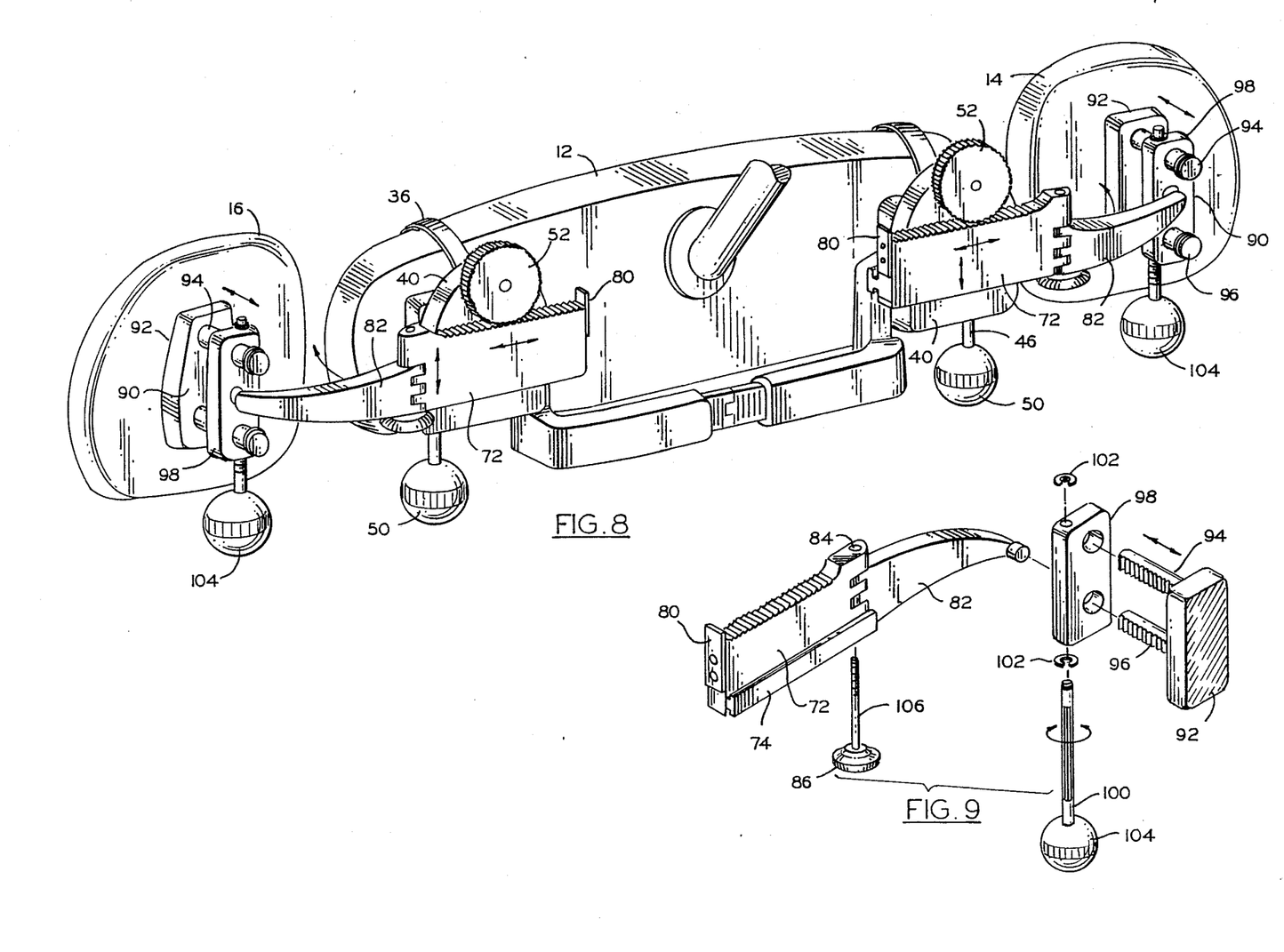
FIG. 8 is a rear perspective view of an auxiliary rear view mirror assembly according to a second embodiment.
FIG. 9 is an exploded view of a portion of the assembly of the second embodiment.
Figure 10:
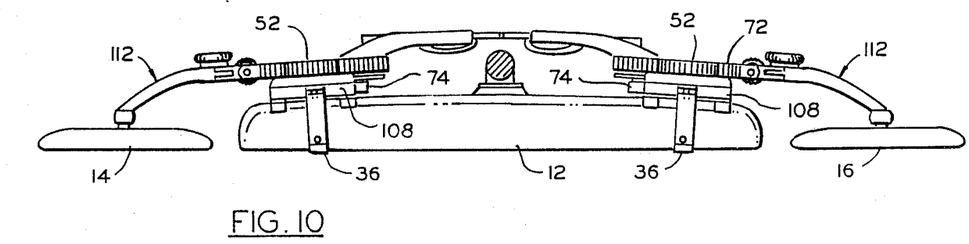
FIGS. 10 and 11 are a top plan view and a rear perspective view of an auxiliary mirror assembly according to a third embodiment of this invention.
Figure 11:
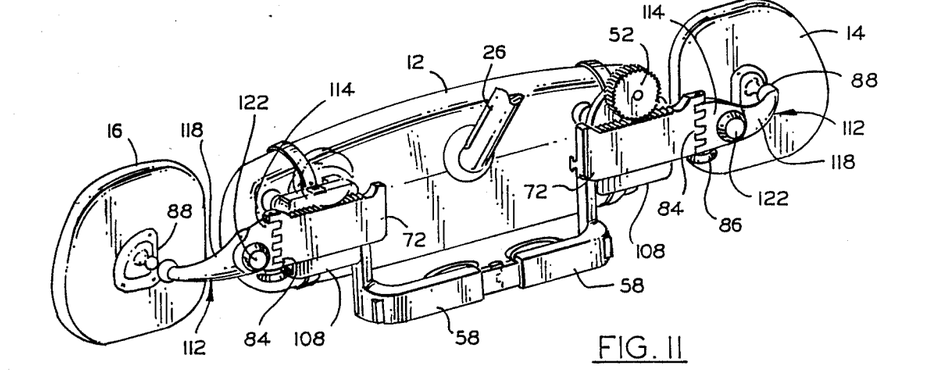

Another embodiment of this invention is shown in FIG. 8 and 9, in which elements identical with those of the previously-described embodiment are identified with the same reference numbers, and for which a detailed description can be omitted. In this embodiment, the mirrors 14 and 16 are connected to the outer ends of the respective support arms 82 by a fore-and-aft rack and pinion adjusting mechanism 90. Each such adjusting mechanism includes a mirror support plate 92 to which is mounted the respective auxiliary mirror 14 or 16, and which has upper and lower toothed pins 94 and 96 projecting therefrom. A second plate 98 has upper and lower openings for the pins 94 and 96, and is universally mounted on the arm 82. A spline pin 100 has a number of elongated grooves thereon which engage the teeth of the pins 94 and 96. The spline pin 100 is situated in a vertical opening in the plate 98, and is retained therein by retaining rings 102. A ball knob 104 is disposed on the lower end of the pin 100 and is rotated for selective depth adjustment of the rack mechanisms 90 and their associated mirrors 14 and 16.

The remaining functions of the mirror assembly of this embodiment are similar to those described in respect to the first embodiment.

Also shown in FIG. 9 is the threaded pin 106 for the vertical hinge 84, as described previously.

Figures 12, 13, 14:
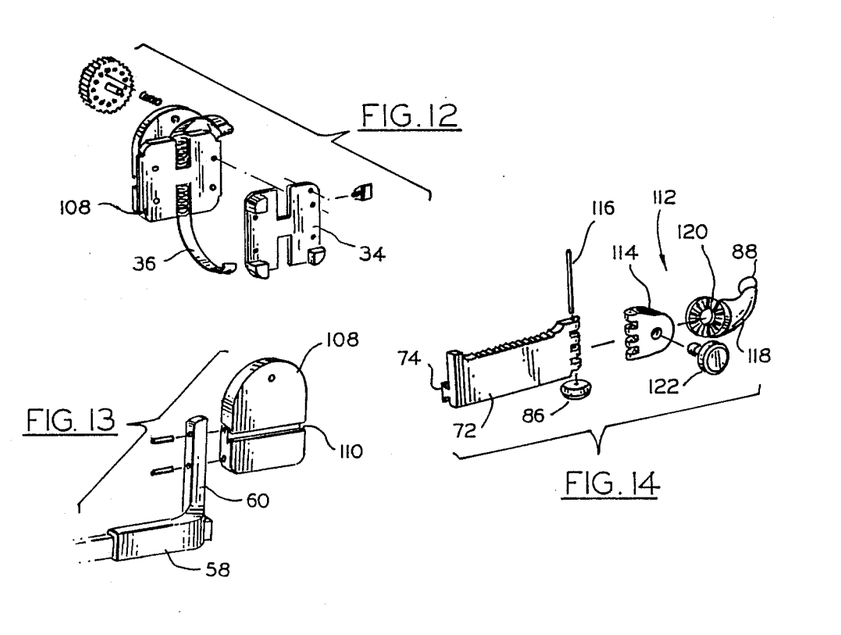
FIGS. 12, 13 and 14 are exploded detail views of portions of the assembly of the third embodiment.

A third embodiment of this invention is depicted in FIGS. 10-14, in which elements identical with those of the previous embodiments are described with the same reference characters. In this embodiment, a non-sliding support plate 108 replaces the support plate 32. This support plate 108 has a lateral T-channel groove 110 in which the T-rib 74 of the associated rack 72 is slidably fitted. A two-part support arm 112 replaces the support arm 82 of the previous embodiment, but is joined to the rack member by means of the vertical hinge 84. The two-part arm 112 has an inner part 114 attached at the vertical hinge 84 to the rack member 72, with a pin 116 extending through the hinge and being tightened by the knob 86. An outer part 118 of the arm has a star gear 120 which mates with a similar surface on the inner arm part 114. A screw member 122, with a knurled head, permits tightening or loosening of the two arm parts 114, 118, for vertical adjustment up or down. The outer arm part 118 has the universal mount 88 on its outer end for supporting the respective auxiliary mirror 14 or 16. As shown in FIG. 12, the non-sliding support plate 108 has the cover 34 mounted directly to its forward-facing surface and the resilient straps 36 attached directly to it. The support plate 108 is joined by pins to the vertical leg 60 of the associated female connector 58, as shown in FIG. 13.

Figure 15:
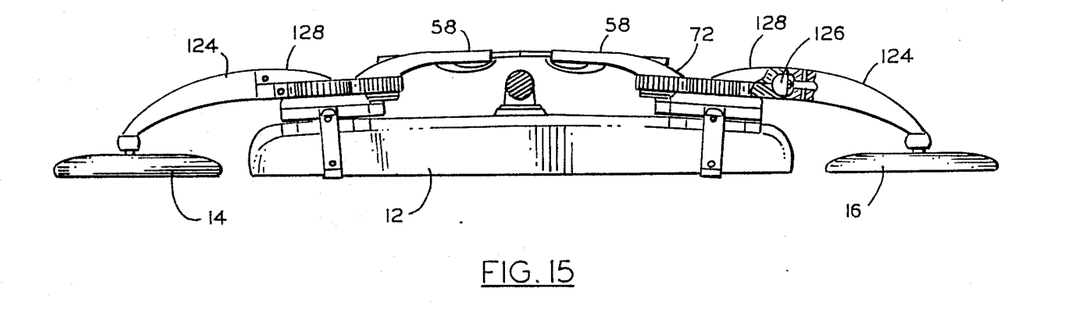
FIGS. 15 and 16 are a top plan view and a rear perspective view of an auxiliary mirror assembly according to a fourth embodiment of this invention.
Figure 16:
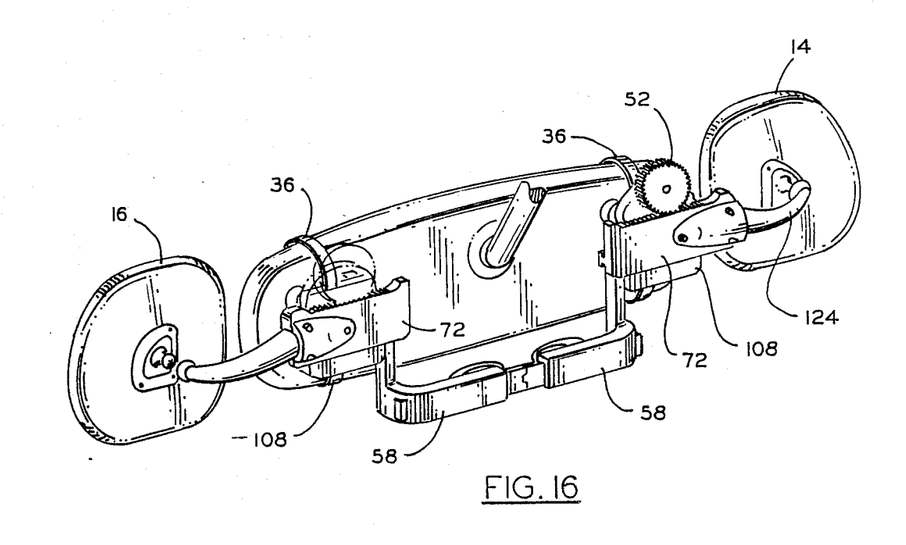
Figure 17:
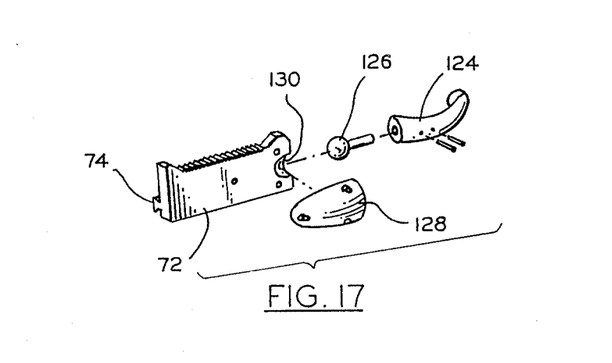
FIG. 17 is an exploded view of a portion of the fourth embodiment.
Figure 18:
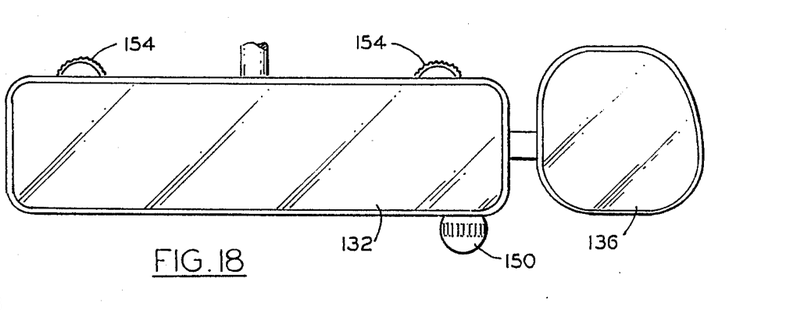
FIGS. 18 and 19 are a front elevation and a rear perspective view of a rear view mirror assembly according to a fifth embodiment of this invention.
Figure 19:
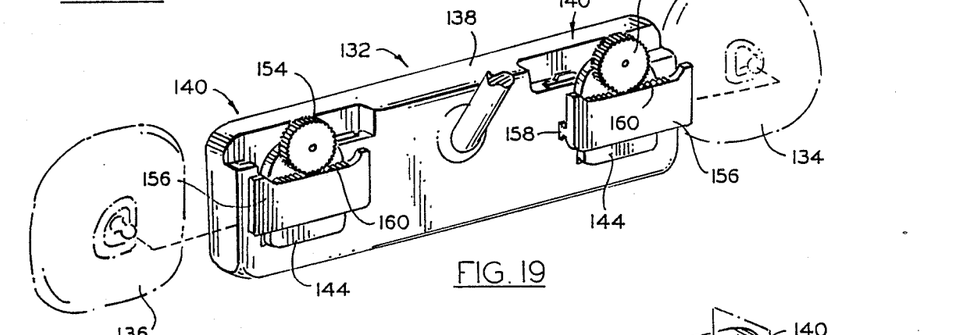
Figure 20:
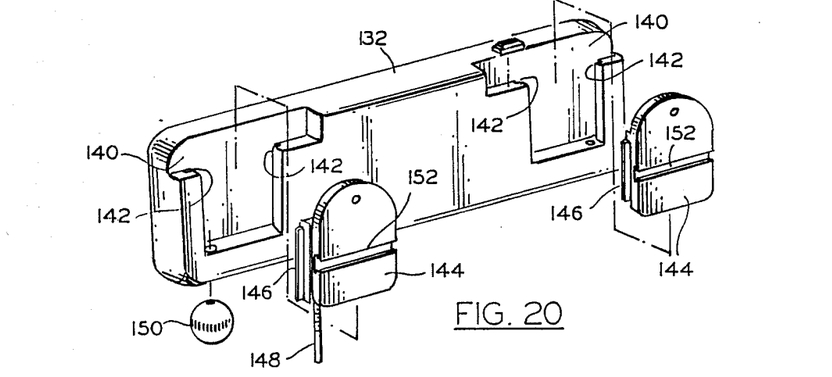
FIG. 20 is an exploded view of portions of the rear view mirror assembly of the fifth embodiment.
Figure 21:
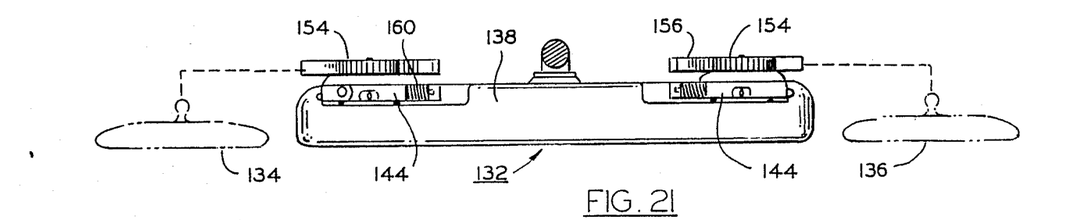
FIG. 21 is a top plan view of the rear view mirror assembly of the fifth embodiment.
Figure 22:
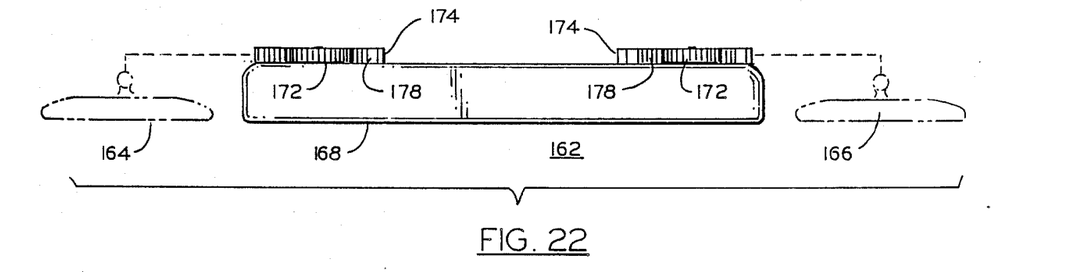
FIGS. 22, 23 and 24 are a top plan view, a side elevation, and a rear perspective view of a rear view mirror assembly according to a sixth embodiment of this invention.
Figure 23:
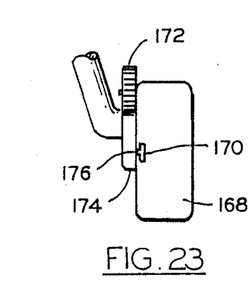
Figure 24:
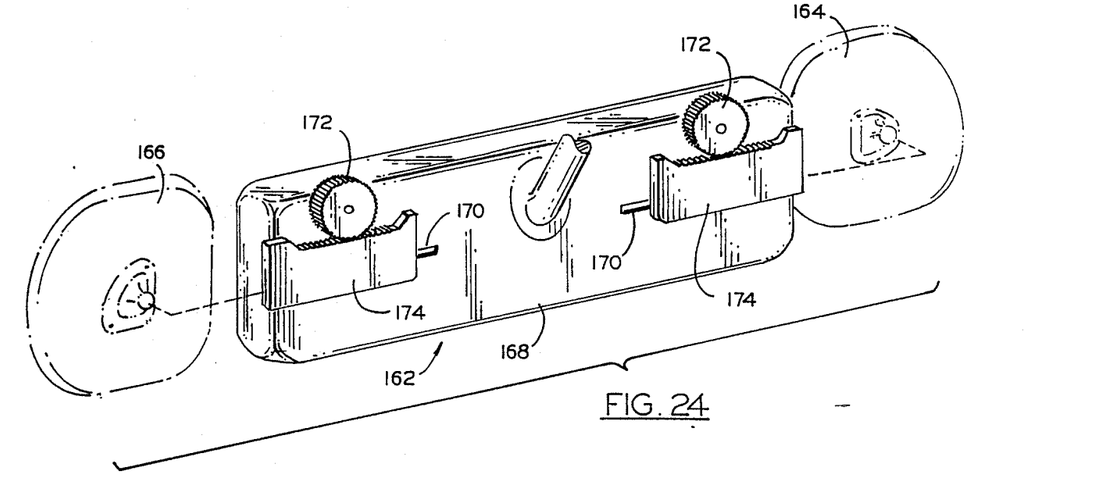
Figure 25:
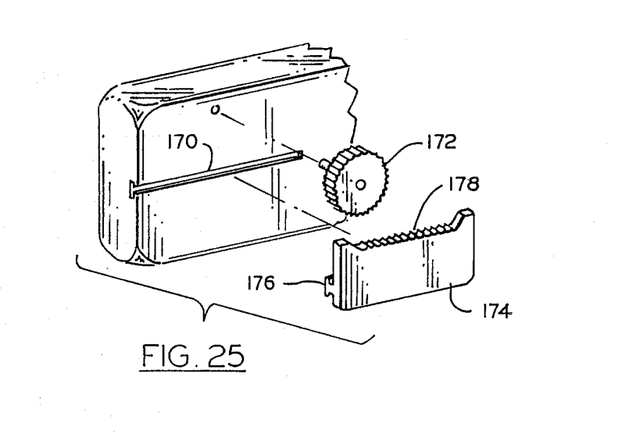
FIG. 25 is an exploded view of a portion of the sixth embodiment.
Figure 26:
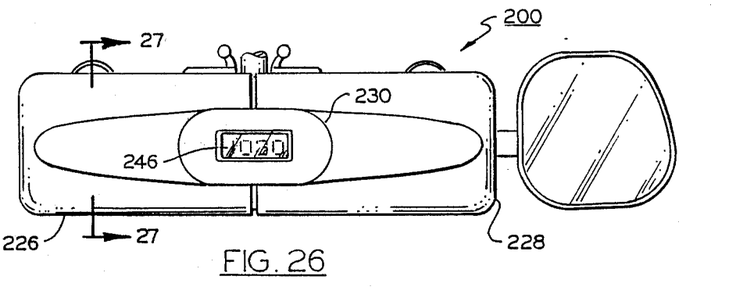
FIG. 26 is a front elevation of an auxiliary mirror assembly according to a seventh embodiment of the present invention.

A fourth embodiment of this invention is shown in FIGS. 15-17. Again, elements identical to those of previous embodiments are identified with the same reference numbers, and would function in the same way. This embodiment employs a ball connection of the support arm to the rack member to achieve two degrees of freedom, i.e., vertically up and down as well as front-to-back. Here, a generally horn-shaped arm 124 has a ball member 126 attached to it. A retainer plate 128 fastens over a socket 130 formed in one end of an associated rack member 72. In this embodiment, the ball connection formed by the ball member 126 and socket 130 permits vertical and depth adjustment, while the rack member 72 and the associated toothed wheel 52 provide for lateral adjustment opposite the positions of the two auxiliary mirrors 14 and 16.

An original-equipment assembly according to a fifth embodiment of this invention is shown in FIGS. 18-21. In this embodiment, rather than auxiliary mirrors fitting onto an existing rear view mirror 12 as previously described, a main rear view mirror assembly 132 has built in or piggy-backed left and right auxiliary rear view mirrors 134 and 136. The function of these auxiliary mirrors are generally the same as the mirrors 14 and 16 described previously, and the details need not be elaborated upon.

In this assembly 132 there is a generally oblong main mirror frame 138, and which has T-shaped vertical cutouts 140 adjacent the left and right ends on its reverse or windshield side. Each cutout 140 has a pair of undercut vertical channels 142. For each auxiliary mirror 134 and 136 there is an associated movable support plate 144 which has a pair of vertical ribs 146 that project laterally from it. These ribs 146 fit slidably into the undercut vertical channels 142, along the sides of the cutout 140. A threaded post 148 fits into a mating threaded vertical opening in the movable plate 144. A ball knob 150 is disposed on the lower end of the post 148 for elevation adjustment of the plate 144 by screw action. A horizontal T-channel slot 152 is provided across each of the movable support plates, and a toothed wheel 154 is pivotally mounted at the upper end of each of the plates 144. A rack member 156, similar to the rack member 72 of the previously described embodiments, has a T-rib 158 that slidably engages the slot 152, and a rack of teeth 160 which engage the toothed wheel 154.

Detail of the connecting arms that extend from the racks 160 to the mirrors 134,136 have been deliberately omitted here to avoid drawing clutter. However, it should be clearly recognized that several alternatives are available, for example, as in the above-described embodiments.

Another version of the original equipment rear view mirror assembly can take the form of the sixth embodiment shown in FIGS. 22-25. Here, the mirror assembly 162 has left and right auxiliary mirrors 164 and 166 that are operatively combined with a frame 168 of the main mirror. In this version, there are lateral T-slots 170 extending to the left and to the right ends respectively, at the back of the frame 168, and a pair of toothed wheels 172 pivotally mounted above the respective slots 170. Left and right rack members 174 each have a T-ridge 176 that slidably engages an associated one of the slots 170. The rack members 174 each have a rack of teeth 178 to engage an associated one of the wheels 172 for lateral movement of the rack members 174 along the slots 170. The mirrors 164 and 166 can be joined to their associated rack members 174 by suitable support arm structure, such as those of the third and fourth embodiments described hereinabove.

A seventh embodiment is depicted in FIGS. 26-31 and is intended for use in trucks, vans, buses, and other vehicles which are generally blind to the rear; and would not have an inside rear view mirror. In this embodiment, an auxiliary mirror assembly 200 has a male support member 210 which is elongated laterally. This support member 210 is connected by a mounting post 212 for support within the cabin of the vehicle, preferably close to the convergence of the windshield and roof. The assembly 200 also includes left and right auxiliary mirrors 214 and 216, which can be position-adjusted in three dimensions and adjusted for angle, as in the embodiments described above.

Detail of the connecting arms that extend from the racks 240 to the mirrors 214 and 216 have been deliberately omitted here to avoid drawing clutter. However, it should be clearly recognized that several alternatives are available, for example, as in the above described embodiments.

Figure 27:
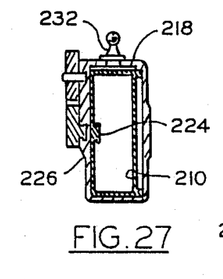
FIG. 27 is a cross-section taken at line 27—27 of FIG. 26.
Figure 28:
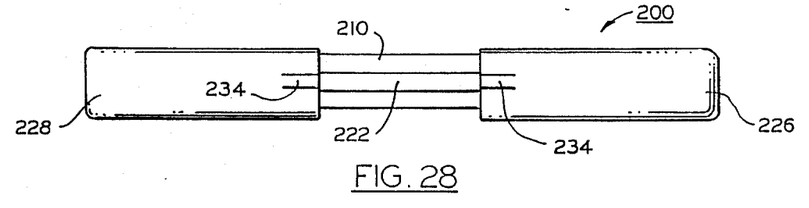
FIGS. 28 and 29 are a bottom plan view and a top plan view of the seventh embodiment.
Figure 29:
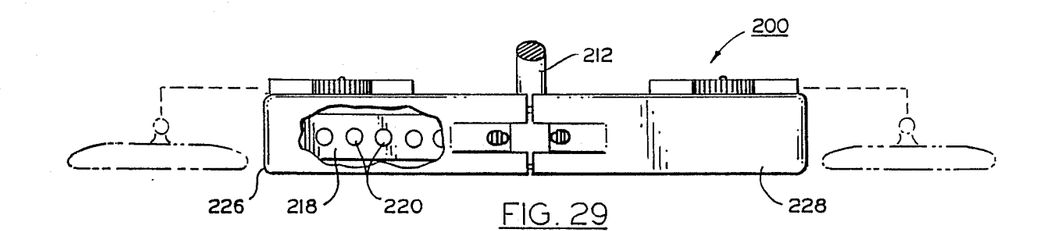
Figures 30, 31:
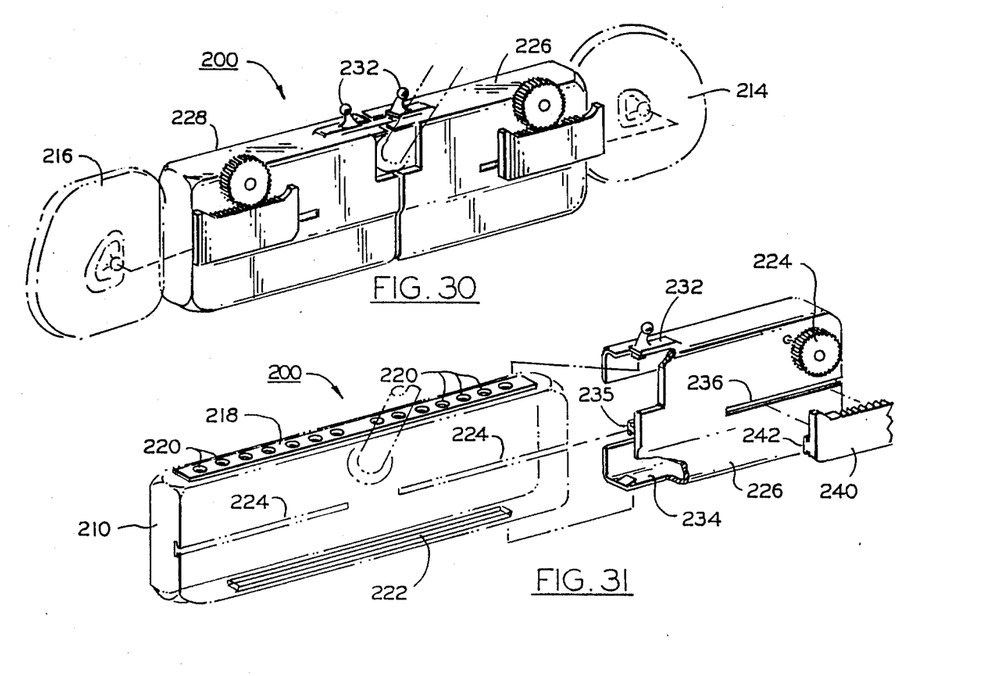
FIG. 30 is a rear perspective view of the seventh embodiment.
FIG. 31 is a partly exploded view of the seventh embodiment.

The male support member 210, as shown in greater detail in FIGS. 28, 29, and 31, and in cross section in FIG. 27, comprises an oblong box member and has a top perforated strip 218 containing a series of perforations 220, and a channel 222 extending along a bottom surface thereof. A T-channel slot 224 extends transversely across the rear surface of the male support member 210, as shown in FIG. 31.

Onto the male support member 210 there are fitted left and right female casing members 226 and 228. These casing members leave a rounded opening 230 to the front and have a raised area upon their front surface, which can incorporate a decorative design.

A securing prong 232 is incorporated into an upper wall of each of the casing members 226 and 228, and is resiliently biased to hold the casing member in place by projecting into a selected one of the perforations 220. A resiliently biased detent 234 slidably engages the lower channel 222 of the male support member 210. There is also a T-rib member 235 in an inner rear surface of each of the female casing members for slidably engaging the T-channel slot 224.

On the outer rear surface of each of the casing members 226 and 228 there is a horizontally extending T-channel slot 236. Rack members 240, similar to the rack members 72 described previously, each include a horizontal T-shaped rib 242, which slidably engages the T-channel slot 236. Toothed wheels 224 are pivotally mounted above the slots 236 on each of the casing members for engaging a rack of teeth on each of the rack members 240. Lateral adjustment of the position of mirrors 214 and 216 is accomplished by first extending the casing members 226 and 228 to desired coarse positions along the male support member 210, and thereafter for fine adjustment moving the rack members 240 along the casing members. Vertical and depth movement of the auxiliary mirrors 214 and 216 can be effected with structure such as that shown in the third and fourth embodiments, described previously.

With this particular arrangement, there is increased lateral travel which assists in accommodating to the extra width of many truck and van cabins. Also, an instrument display, in this embodiment, a clock 246, can be incorporated into a central portion of the male support member 210.

With any of the above-described embodiments, the mirror positions are maintained, despite high frequency vibration that may result from movement of the vehicle on the roadway. Also, the auxiliary mirror positions can be changed readily for different drivers assuming the operating position. In each of the above described embodiments, the mirrors can be used and relied on to monitor blind zones, and eliminates the need for an operator to turn his or her head away from the direction of travel. Also, the main mirror and the auxiliary mirrors can be of prismatic type, having day and night positions. In that case, the day and night positions of the auxiliary mirrors are assumed with corresponding movement of the main mirror.

While this invention has been described in detail with respect to certain preferred embodiments, it should be understood that the invention is not limited to those precise embodiments. For instance, it would be within the principles of this invention to provide an auxiliary mirror only on one end or the other of the main mirror. However, many modifications and variations would present themselves to those of skill in the art without departing from the scope and spirit of this invention, as defined in the appended claims.

What is claimed is:

1. An auxiliary rear view mirror assembly which attaches onto an existing automotive interior main rear view mirror of the type which has a laterally elongated frame and means connected to said frame to mount the mirror inside the vehicle, the auxiliary mirror assembly comprising at least one auxiliary rear view mirror, at least one support plate including means for attaching the same onto a rear surface of the frame of the main rear view mirror, an auxiliary arm connecting said auxiliary mirror to said support plate to position said auxiliary rear view mirror beyond an end of the main rear view mirror, and auxiliary mirror adjusting means for independently adjusting the position of said auxiliary mirror in three dimensions relative to said main rear view mirror, after the assembly is attached in place onto the main rear view mirror, in order to permit a vehicle operator to raise or lower the auxiliary mirror, to move the auxiliary mirror laterally closer to or farther from the end of the main rear view mirror, and to move the auxiliary mirror ahead or back in respect to the frame of the main rear view mirror.

2. The auxiliary rear view mirror assembly of claim 1 wherein said auxiliary mirror is of unit magnification.

3. The auxiliary rear view mirror assembly of claim 2 wherein said auxiliary mirror is of the prismatic type which day and night positions are assumed with corresponding movement of the main mirror.

4. The auxiliary rear view mirror assembly of claim 1 in which said means for adjusting the position of said auxiliary mirror to move the latter laterally includes a toothed wheel pivotally mounted on said support plate which can be rotated by the vehicle operator, a laterally oriented guide member on said support plate, a laterally extending member on said auxiliary arm that cooperates with said guide member to permit lateral motion of the arm with respect to the support plate, and a toothed rack on another surface of said auxiliary arm which is engaged by said wheel.

5. The auxiliary rear view mirror assembly of claim 4 in which said wheel includes spring detente means for retaining the wheel in position after being selectively rotated by said operator.

6. The auxiliary rear view mirror assembly of claim 4 in which said guide member includes a profiled cross section slot having a narrow opening and broad interior, and said laterally extending member includes a profiled cross section rib which fits in said slot and slides laterally therein.

7. The auxiliary rear view mirror assembly of claim 6 wherein said slot and said rib are of T-shaped cross section.

8. The auxiliary rear view mirror assembly of claim 1 wherein said auxiliary mirror adjusting means for raising or lowering the auxiliary mirror includes an articulation in said auxiliary arm having a horizontal axis, a threaded tightening screw through said articulation, and a knob connected to said tightening screw.

9. The auxiliary rear view mirror assembly of claim 8 wherein said articulation comprises a star gear on one portion of said auxiliary arm, and a mating star gear on a second portion of said auxiliary arm.

10. The auxiliary rear view mirror assembly of claim 1 wherein said auxiliary mirror adjusting means for moving the auxiliary mirror ahead or back in respect to the frame of the main rear view mirror includes a vertical hinge in said auxiliary arm, a threaded vertical pin through said hinge, and means permitting the pin to be selectively tightened in said hinge.

11. The auxiliary rear view mirror assembly of claim 1 in which said means for adjusting the position of the auxiliary mirror to raise or lower the auxiliary mirror includes two plates, one of which includes means for attaching the same onto a rear surface of the frame of the main rear view mirror, a vertical threaded screw member, means affixing said vertical screw member axially relative to one of said plates, and a threaded nut riding on said vertical screw member and affixed vertically relative to the other of said plates, so that selective rotation of said screw member raises or lowers the auxiliary mirror relative to the main rear view mirror.

12. The auxiliary rear view mirror assembly of claim 11 in which said means for adjusting further includes a ball knob carried on one end of said screw member.

13. The auxiliary rear view mirror assembly of claim 1 in which said adjusting means for moving the auxiliary mirror ahead or back includes a rack and pinion system having an elongated spline pin carried on one of said auxiliary mirror and said arm and at least one rack member carried on the other of said arm and said auxiliary mirror which engages said spline pin and moves said auxiliary mirror ahead or back when said spline pin is selectively rotated.

14. The auxiliary rear view mirror assembly of claim 1, further comprising universal mounting means mounting said auxiliary mirror on said auxiliary arm to permit angular adjustment of said auxiliary mirror on said arm independently of the adjusted position achieved by said auxiliary mirror adjusting means.

15. An auxiliary rear view mirror assembly which attaches onto an existing automotive main rear view mirror of the type which has a laterally elongated frame and means connected to said frame to support the rear view mirror on a motor vehicle, the assembly comprising left side and right side auxiliary mirrors, left side and right side support plate assemblies each including means for attaching same onto a rear surface of the frame of the main rear view mirror, a rigid support connector for connecting the left and right support plate assemblies to one another when the latter are attached onto said main rear view mirror frame; left and right auxiliary arms connecting the left and right side auxiliary mirrors respectively to the left side and right side support plate assemblies to position and hold the left side auxiliary mirror leftward of the main rear view mirror and to position and hold the right side auxiliary mirror rightward of the main rear view mirror; and respective left and right side auxiliary mirror position adjusting means for independently adjusting the positions of the left side auxiliary rear view mirror and the right side auxiliary rear view mirror in three dimensions, namely right-left, up-down, and fore-aft with respect to the main rear view mirror after the auxiliary rear view mirror assembly has been installed thereon.

16. The auxiliary rear view mirror assembly of claim 15, further comprising universal mounting means mounting said auxiliary mirrors on the associated auxiliary arms to permit angular adjustment of the auxiliary mirrors on said arms independently of the adjusted position achieved by said left and right side auxiliary mirror position adjusting means.

17. The auxiliary rear view mirror assembly of claim 15 wherein said left and right support plate assemblies attaching means each include a support plate, and an upper strap and a lower strap mounted on said support plate and which hook onto upper and lower edges of the frame of said main rear view mirror.

18. The auxiliary rear view mirror assembly of claim 17, wherein said rigid support connector includes left and right side female members affixed on a right side of the left support plate and on a left side of the right support plate respectively, and extending laterally, and a male bar held in distal ends of said female members.

19. The auxiliary rear view mirror assembly of claim 18 wherein said female members are generally L-shaped having a leg connected to the associated support plate and a hollow tubular portion extending at a right angle to said leg.

20. The auxiliary rear view mirror assembly of claim 18 wherein said male bar has left and right bar portions joined at a vertical hinge.

21. The auxiliary rear view mirror assembly of claim 18 wherein said male bar has a row of teeth along one surface and said female members each include a spring clip having one end to engage the teeth of said male bar.

22. The auxiliary rear view mirror assembly of claim 17 wherein said support plate assemblies each include a support plate and a movable plate, with a guide groove being formed in one surface of said support plate, and a ridge being formed on a facing surface of said movable plate to cooperate with said guide groove to permit relative movement of said movable plate and said support plate; and means rotatable by hand by an operator of the motor vehicle to slide the movable plate in the direction of said guide groove and said ridge.

23. The auxiliary rear view mirror assembly of claim 17 wherein each said auxiliary arm includes a toothed rack mounting the arm onto the associated support plate, said rack having an elongated laterally extending ridge and said support plate having a cooperating laterally extending guide groove in which said ridge is slidably fitted, and a toothed wheel pivotally mounted on said support plate and meshing with teeth of said rack to effect lateral motion of said arm and the associated auxiliary mirror.

24. The auxiliary rear view mirror assembly of claim 23 wherein said toothed wheel includes a spring detent.

25. A rear view mirror assembly for a vehicle which avoids blind spots to left and right of the vehicle, comprising a main rear view mirror which includes a laterally elongated housing having a front in which a glass is mounted and a rear, and a mounting arm attached to the rear of the housing for supporting the main rear view mirror in said vehicle; left and right auxiliary rear view mirrors disposed to the left of a left end of the main mirror and to the right of a right end of the main mirror, respectively; left and right auxiliary support arms extending to the left and to the right from the rear of the main mirror housing, respectively, on which the left and right auxiliary mirrors are respectively mounted; and auxiliary mirror adjusting means for independently adjusting the position of said auxiliary mirrors in three dimensions relative to the main mirror and permitting a vehicle operator to raise or lower each auxiliary mirror, to move each auxiliary mirror laterally closer to or farther from the respective end of the main mirror, and to move each of the auxiliary mirrors fore and aft in respect to the main mirror.

26. The rear view mirror assembly of claim 25 further comprising universal mounting means for mounting the auxiliary mirrors onto ends of the associated support arms to permit angular adjustment of said auxiliary mirrors independently of the adjusted position achieved by said auxiliary mirror adjusting means.

27. The rear view mirror assembly of claim 26 wherein each of said main mirror and said auxiliary mirrors is of unit magnification.

28. The rear view mirror assembly of claim 25 wherein said main mirror frame has left and right channel cutouts which are oriented vertically; left and right support plates positioned in said left and right channel cutouts, respectively, and enjoying at least limited motion only in the vertical direction of the channel; threaded rods positioned vertically in threaded openings in each of said support plates, and respective knobs on said rods to effect selective vertical adjustment of said support plates in said cutouts; left and right rack members on which the associated auxiliary arms are mounted, each said rack member having a ridge extending laterally on a forward surface and a rack of teeth; said left and right support plates each having a laterally extending channel guide groove in which the ridge of the associated rack member is slidably fitted to permit at least limited left-to-right motion of the rack member with respect to the support plate; and toothed wheels pivotally mounted on the respective support plates and each engaging the toothed rack of the associated rack member.

29. The rear view mirror assembly of claim 25 wherein said main mirror housing has at least one laterally extending channel guide groove situated in the rear of the frame at the left end and at the right end thereof; left and right rack members on which the left and right auxiliary arms are respectively mounted, each said rack member having a laterally extending ridge which slidably fits into the guide groove at the left and right ends of the main mirror housing, respectively, and a laterally extending rack of teeth; and left and right toothed wheels pivotally mounted on said main mirror housing and respectively engaging the rack of teeth of the left and right rack member to effect selective lateral positioning of the left and right auxiliary mirrors.

30. The rear view mirror assembly of claim 29 wherein each of said toothed wheels includes a spring detent.

31. An anti-blindspot mirror device for a motor vehicle which is blind to the rear from inside its cab, comprising an elongated male support which extends to left and right of a mounting post, left and right female casings which slide laterally over said male support and including means for retaining the left and right casings on the male support; left and right auxiliary mirrors to be disposed leftwards of a left end of the left female casing and rightwards of a right end of the right female casing, respectively; left and right support arms extending from the left and right female casings to support the left and right auxiliary mirrors; universal mounting means on said support arms by which the associated auxiliary mirrors are attached and permitting independent angular adjustment of the mirrors; and mirror position adjusting means for adjusting the position of said auxiliary mirrors in three dimensions relative to said male support, independently of the angular adjustment of the mirrors achieved by said universal mounting means, permitting a vehicle operator to raise or lower the auxiliary mirrors, to move the auxiliary mirrors closer to or farther from the ends of the female casings, and to move the mirrors ahead or back in respect to the position of the male support.

32. The mirror device of claim 31 wherein said male support comprises an oblong box member having an elongated upper surface with a row of perforations along its length and an elongated lower surface having a longitudinal guide groove formed therein, and each of said female casings has a securing prong resiliently biased down from an upper portion of the female casing for selectively engaging a perforation of said row, and a protuberance extending upward from a lower portion thereof for engaging said guide channel.

33. The mirror device of claim 31 wherein said female casings are open at a forward face thereof to leave a center portion of the male support visible when installed thereon, and said male support has an instrument indicator visibly displayed at a center portion thereof.

34. The mirror device of claim 31 wherein said male support has a rear surface in which a laterally extending T-channel slot is formed, and each of said female casings has a T-rib formed in a facing surface for slidably engaging said slot.

* * * * *